United States Patent Office 3,801,599
Patented Apr. 2, 1974

3,801,599
PROCESS FOR THE PREPARATION OF 2,2,4,4-TET-RAFLUORO-1,3-BENZODIOXANES
Hans-Ulrich Alles, Leichlingen, Germany, assignor to Bayer Aktiengesellschaft, Leverkusen, Germany
No Drawing. Filed Aug. 10, 1971, Ser. No. 170,653
Claims priority, application Germany, Aug. 13, 1970, P 20 40 186.9
Int. Cl. C07d 15/08
U.S. Cl. 260—340.3
8 Claims

ABSTRACT OF THE DISCLOSURE 2,2,4,4-tetrafluoro-1,3-benzodioaxanes having the formula

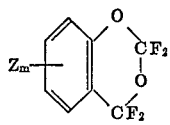

wherein
m is 0–4, and
Z is a substituent group which may be the same or different when m is 2–4,
are prepared by reacting 2-trichloromethoxybenzoyl-chloride with an excess of anhydrous hydrofluoric acid at a temperature of from —10 to 40° C.

BACKGROUND

The present invention relates to a process for the production of 2,2,4,4-tetrafluoro-1,3-benzodioxans from 2-trichloromethoxybenzoyl chlorides.

It has been suggested (see Belgian Pat. 725,053) that 1,3-benzodioxans which are fluorinated in the heterocyclic ring can be obtained by reacting 2-trichloromethyl-phenyl haloformates with anhydrous hydrofluoric acid.

It is known that 3-trichloromethoxy- and 4-trichloromethoxybenzoyl chlorides can be reacted with antimony-trifluoride to give 3-trifluoromethoxy- and 4-trifluoromethoxybenzoylfluorides (Doklad. Akad. Nauk. Reports of the Academicy of Sciences, 105, 100 (1955)). Furthermore, it is known that for the fluorination of 4-trichloromethoxychlorobenzene to give the trifluoroanisole derivative with anhydrous hydrofluoric acid, temperatures of 120° C. under pressure are necessary (Federal German Pat. 1,000,393 (1954)).

The fluorination of 2-trichloromethoxybenzoyl chlorides has not hitherto been described.

SUMMARY

The present invention provides a process for the production of a 2,2,4,4-tetrafluoro-1,3-benzodioxan of the general formula:

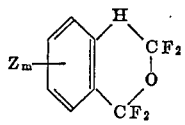

(I)

in which
m is 0, 1, 2, 3 or 4, and
Z is halogen such as, chlorine or fluorine (if m is 2, 3 or 4 the halogen atoms may be the same or different) and, if m is 1 or 2, stands for trihaloalkyl such as difluorochloromethyl, trifluoromethyl and trichloromethyl halocarbonyl such as chlorocarbonyl and fluorocarbonyl trihaloalkoxy such as trichloromethoxy and trifluoromethoxy, difluorochloromethoxy and dichlorofluoromethoxy or isocyanato, in which a 2-trichloromethoxybenzoyl chloride of the general formula

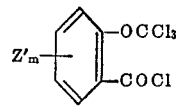

(II)

in which
m is 0, 1, 2, 3 or 4, and
Z' is as described for Z,
is reacted with a two- to eight-fold excess of anhydrous hydrofluoric acid at temperatures from —10 to 40° C.

DESCRIPTION

The reaction is preferably carried out with a 3- to 6-fold excess of the hydrofluoric acid. It is preferably carried out at 0 to 20° C. It may be carried out in an inert organic solvent, e.g. methylene chloride or carbon tetrachloride.

It is very surprising that the present process yields 2,2,4,4-tetrafluoro-1,3-benzodioxans, especially as it might have been expected that 2-trifluoromethoxybenzoyl fluorides would be formed.

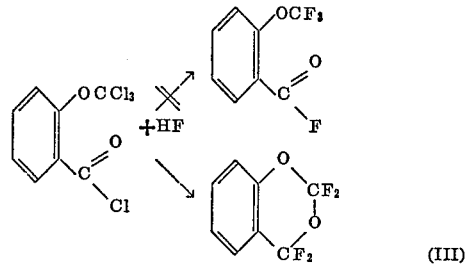

(III)

The reaction of 2-trichloromethoxy-benzoyl chlorides with hydrofluoric acid occurs even under unexpectedly mild conditions.

The starting compounds used for the process can be obtained according to known methods, for example by chlorination of (possibly substituted) 2-methoxy-benzoyl chlorides in the presence of $PCl_5$ with elemental chlorine at temperatures up to 200° C. With this preparative method however, a side reaction, namely a cyclization, is also observed. Thus, for example, from 2-methoxybenzoyl chloride, 2,2-dichlorocoumaranone is obtained as chlorination by-product. In the presence of Friedel-Crafts catalysts, 2-trichloromethoxy benzoyl chlorides can be isomerized in exothermic reaction to give chloroformic acid 2-trichloromethyl-phenyl esters. For example, from 2-trichloromethoxy-benzoyl chloride with addition of less than 1 mole percent of anhydrous ferric chloride there is obtained quantitatively chloroformic acid 2-trichloromethylphenyl ester. Therefore, when preparing the starting compounds by chlorination of the 2-methoxybenzoyl chlorides and in the distillation of the chlorination products, attention is to be paid to the absence of such catalysts.

Examples of starting compounds for the process of the invention include 2-trichloromethoxybenzoyl chloride, 2-trichloromethoxy-5-chlorobenzoyl chloride, 2-trichloromethoxy-4-fluorobenzoyl chloride, 2-trichloromethoxy-4-trichloromethylbenzoyl chloride, 2-trichloromethoxyisophthalic acid dichloride.

In a suitable method of carrying out the process according to the invention, into an excess of anhydrous hydrofluoric acid in a stainless steel autoclave there is metered the trichloromethoxy compound (possibly dissolved in an inert solvent, e.g. methylene chloride or carbon tetrachloride) at —10° to +40° C. (preferably 0° to 20° C.). The reaction may be carried out under superatmospheric pressure, especially when it is carried out at a temperature over 20° C. when it should be carried out under a pressure which lies above the vapor pressure (corresponding to the reaction temperature concerned) of the hydrofluoric acid. Suitable pressures are for example 2 to 10 atmospheres gauge at 30° or 3 to 20 atmospheres gauge at 40°. After cessation of evolution of hydrogen chloride, first the excess hydrofluoric acid and, where appropriate, the solvent are distilled off. The residue is fractionated for purification.

The compounds obtainable by the process according to the invention can be used for the preparation of herbicides (see Belgian Pat. 731,669).

The following examples wherein temperatures are stated in degrees C. are intended to illustrate the invention without limiting same.

EXAMPLE 1

To 120 ml. of anhydrous hydrofluoric acid in a stirred vessel made of stainless steel there are added dropwise at 0° 110 g. 2-trichloromethoxy-benzoyl chloride. When the evolution of hydrogen chloride abates, the temperature is increased to 18° and the reaction is allowed to continue until the cessation of HCl evolution. After the excess hydrofluoric acid has been distilled off the residue is distilled in a vacuum. There are obtained 56 g. (about 80% of the theory) 2,2,4,4-tetrafluoro-1,3-benzodioxan, B.P. 54°/14 mm. Hg, $n_D^{20}=1.4205$.

For the fluorination, the crude chlorination product can also be used. In the distillation, tetrafluoro-1,3-benzodioxan is obtained as the lowest boiling component.

The 2-trichloromethoxy-benzoyl chloride used for the reaction is obtained as follows: To 450 g. 2-methoxy-benzoyl chloride are aded 22 g. phosphorus pentachloride and treatment with chlorine is effected for 8 hours at 200°. The chlorination crude product is fractionated. There are obtained as first runnings 170 g. 2,2-dichloro-coumaranone, B.P. 100°/0.7 mm. Hg, M.P. 72°. The intermediate runnings consist of a small amount of slightly chlorinated product which is again used for chlorination, and as main fraction there are obtained 350 g. 2-trichloromethoxy-benzoyl chloride, B.P. 112°/0.7 mm. Hg, $n_D^{20}=1.5695$.

EXAMPLE 2

Of 190 g. 2-trichloromethoxy-5-chloro-benzoyl chloride (prepared by chlorination 10 hours at 200° of 140 g. 2-methoxy-5-chloro-benzoyl chloride in the presence of 8 g. PCl$_5$), 90 g. are added dropwise at 0° to 10° to 100 ml. anhydrous hydrofluoric acid. After subsidence of evolution of HCl, reaction is caused to proceed to completion at 3.5 atmospheres gauge up to 40°. After the hydrofluoric acid excess has been distilled off, there are obtained by fractional distillation 35 g. 2,2,4,4-tetrafluoro-6-chloro-1,3-benzodioxan, B.P. 70–72°/20 mm. Hg; $n_D^{20}=1.4510$.

EXAMPLE 3

To 100 ml. of anhydrous hydrofluoric acid there are added dropwise, at 0° to 10°, 75 g. 4-trichloromethoxy-isophthalic acid dichloride (prepared by chlorination of 4-methoxy-isophthalic acid dichloride) dissolved in 75 ml. of dry methylenechloride. Reaction is caused to proceed to completion at 18° and the residue, after the HF and the methylene chloride have been distilled off, is fractionated. There are obtained 17 g. 2,2,4,4-tetrafluoro-6-fluorocarbonyl-1,3-benzodioxan, B.P. 100–102°/12 mm. Hg.

In analogous manner, there can be prepared:
2,2,4,4-tetrafluoro-7-chloro-1,3-benzodioxan, B.P. 68°/12 mn. Hg; $n_D^{20}=1.4489$;
2,2,4,4-tetrafluoro-6-isocyanato-1,3-benzodioxan, B.P. 98°/15 mm. Hg; M.P. 43–45°; and
2,2,4,4-tetrafluoro - 7 - difluorochloromethyl-1,3-benzodioxan, B.P. 75°/13 mm. Hg; $n_D^{20}=1.4260$.

What is claimed is:
1. Process for preparing 2,2,4,4-tetrafluoro-1,3-benzodioxanes having the formula

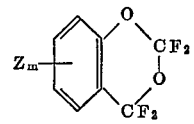

in which
m is 0, 1, 2, 3 or 4, and
Z is halogen (if m is 2, 3 or 4 the halogen atoms may be the same or different) and, if m is 1 or 2, is selected from the group of trihaloalkyl, halocarbonyl, trihaloalkoxy and isocyanato,
which comprises reacting a 2-trichloromethoxy benzoyl chloride having the formula

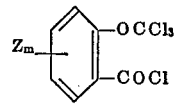

in which
m is 0, 1, 2, 3 or 4, and
Z is as defined above,
with a 2–8 fold excess of anhydrous hydrofluoric acid at a temperature of from −10 to 40° C.

2. Process of claim 1 wherein Z is chlorine or fluorine.

3. Process of claim 1 wherein m is 1 or 2 and Z is selected from the group of trichloromethyl, trifluoromethyl, difluorochloromethyl, chlorocarbonyl, fluorocarbonyl, trichloromethoxy, trifluoromethoxy, difluorochloromethoxy dichlorofluoromethoxy and isocyanato.

4. Process of claim 1 wherein a 3–6 fold excess of hydrofluoric acid is used.

5. Process of claim 1 carried out at a temperature of from 0–20° C.

6. Process of claim 1 carried out at superatmospheric pressure.

7. Process of claim 6 wherein said pressure is greater than the vapor pressure of the hydrofluoric acid.

8. Process of claim 1 carried out in an inert organic solvent.

References Cited
UNITED STATES PATENTS
2,510,036   5/1950   Mowry _____ 260—340.3 X OTHER REFERENCES
Lee: "Chemical Abstracts," vol. 67, col. 73563d, p. 4930, 1967.

NICHOLAS S. RIZZO, Primary Examiner
J. H. TURNIPSEED, Assistant Examiner